Figure 6:
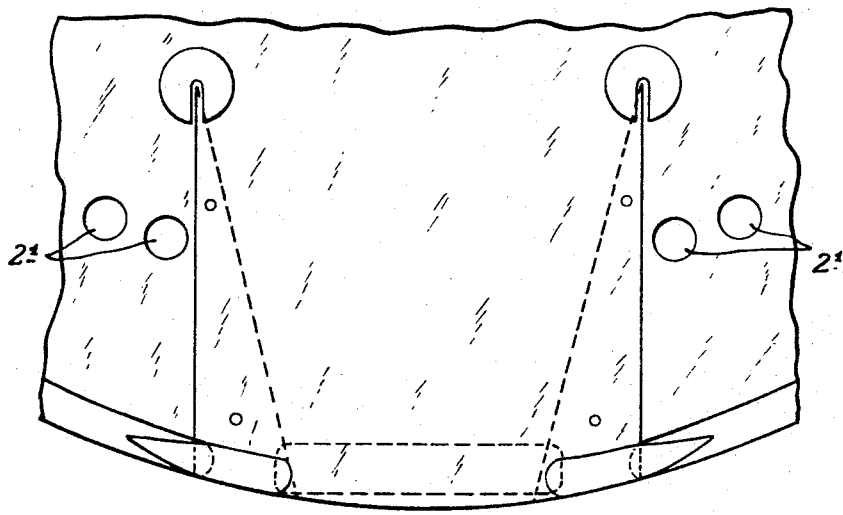

Jan. 3, 1967  J. P. CROUZET  3,295,511
HEADGEARS FOR PROTECTION AGAINST COLD AND UNCLEMENT WEATHER
Filed Feb. 10, 1965  6 Sheets-Sheet 1
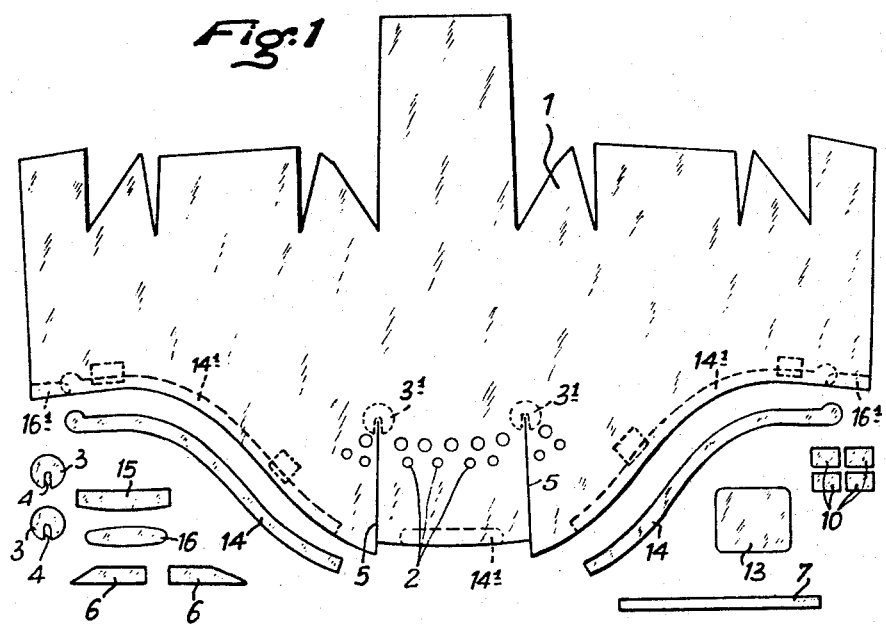
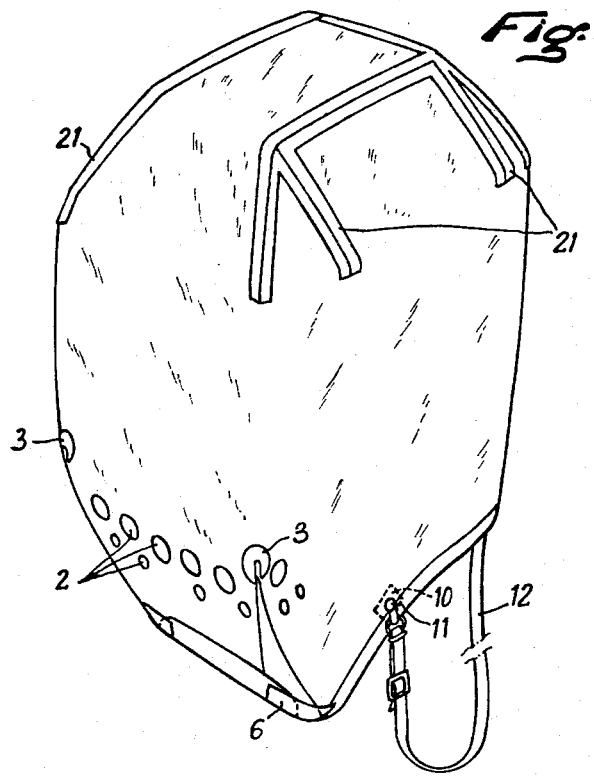
INVENTOR
JEAN-PHILIPPE CROUZET
By Irwin S. Thompson
ATTY.

Jan. 3, 1967  J. P. CROUZET  3,295,511
HEADGEARS FOR PROTECTION AGAINST COLD AND UNCLEMENT WEATHER
Filed Feb. 10, 1965  6 Sheets-Sheet 2
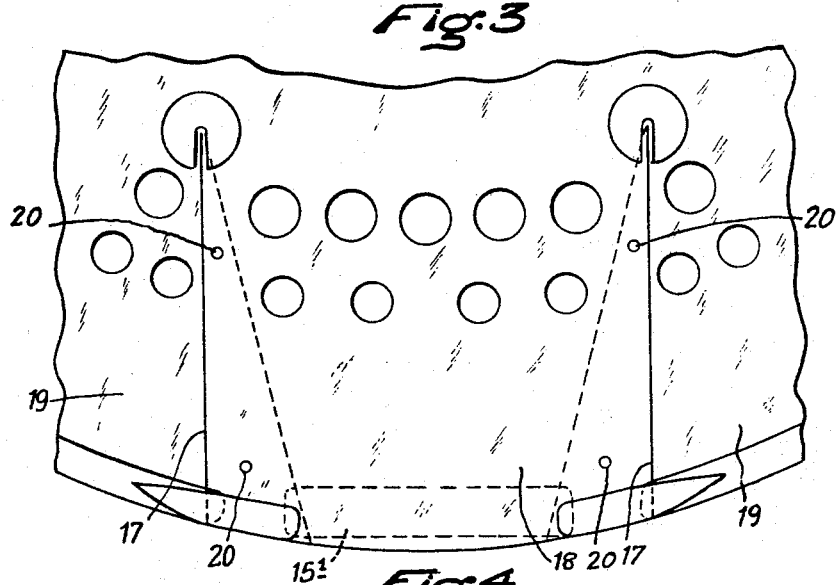
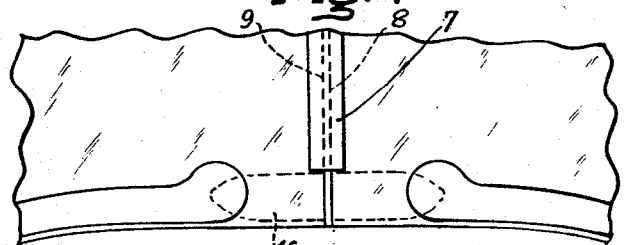
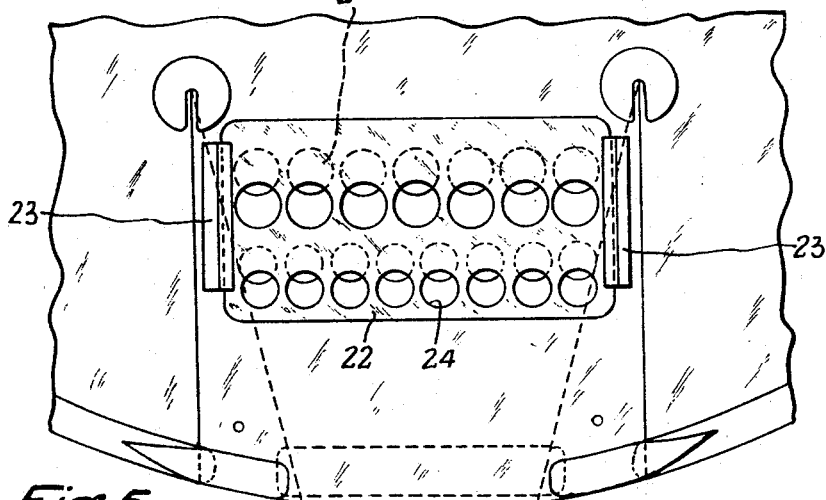
INVENTOR
JEAN-PHILIPPE CROUZET
By Irwin J. Thompson
ATTY.

Jan. 3, 1967 J. P. CROUZET 3,295,511
HEADGEARS FOR PROTECTION AGAINST COLD AND UNCLEMENT WEATHER
Filed Feb. 10, 1965 6 Sheets-Sheet 3

INVENTOR
JEAN-PHILIPPE CROUZET
By Irwin S. Thompson
ATTY.

Jan. 3, 1967  J. P. CROUZET  3,295,511
HEADGEARS FOR PROTECTION AGAINST COLD AND UNCLEMENT WEATHER
Filed Feb. 10, 1965  6 Sheets-Sheet 4
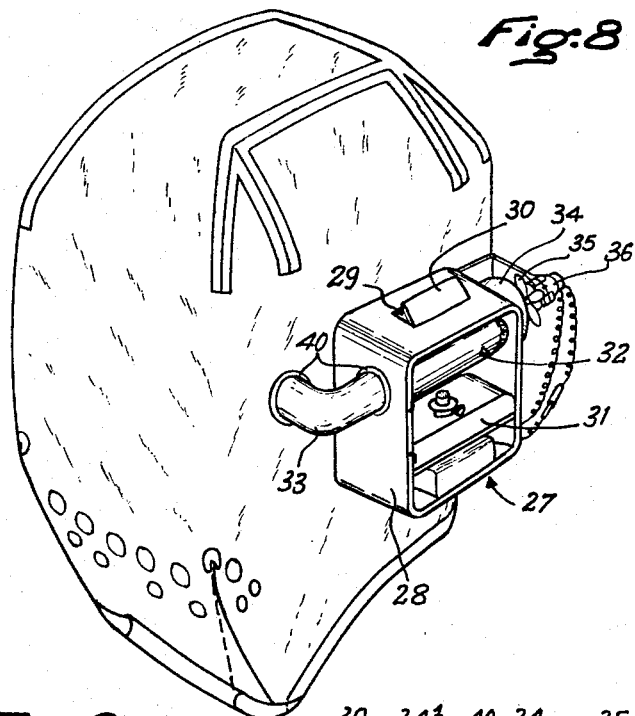
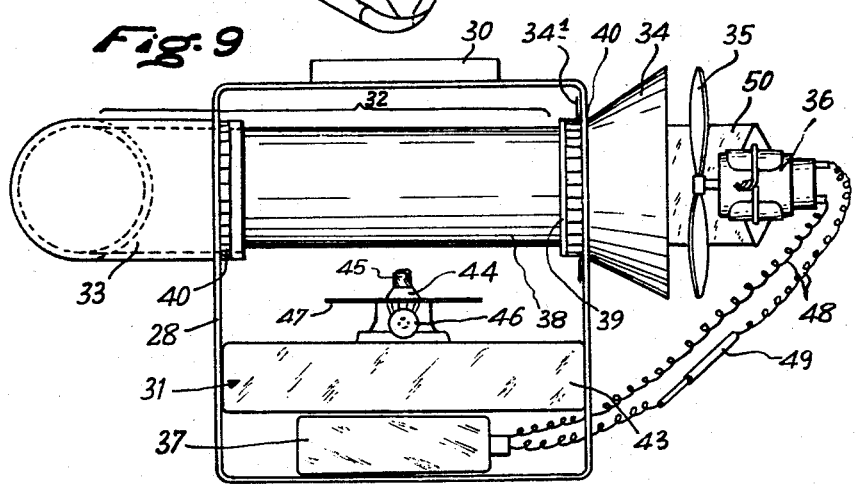
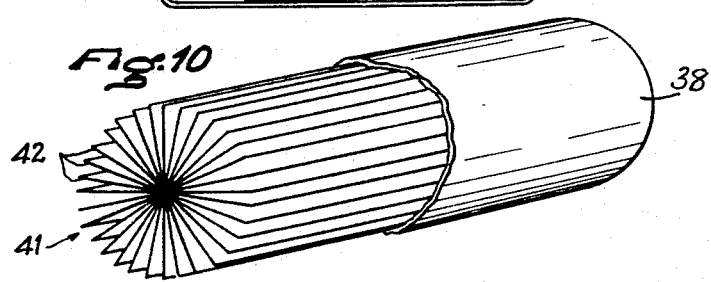
INVENTOR
JEAN-PHILIPPE CROUZET
By Irwin & Thompson
ATTY.

Jan. 3, 1967 J. P. CROUZET 3,295,511
HEADGEARS FOR PROTECTION AGAINST COLD AND UNCLEMENT WEATHER
Filed Feb. 10, 1965 6 Sheets-Sheet 5
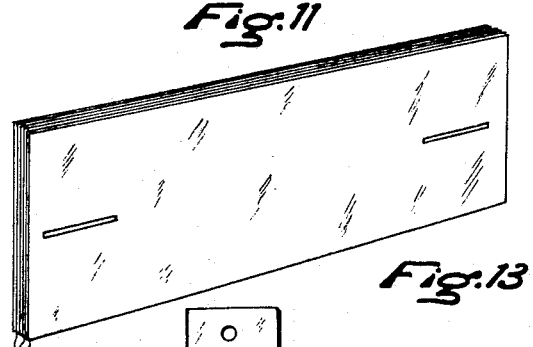
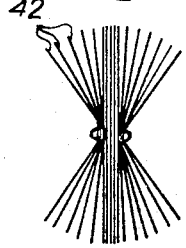
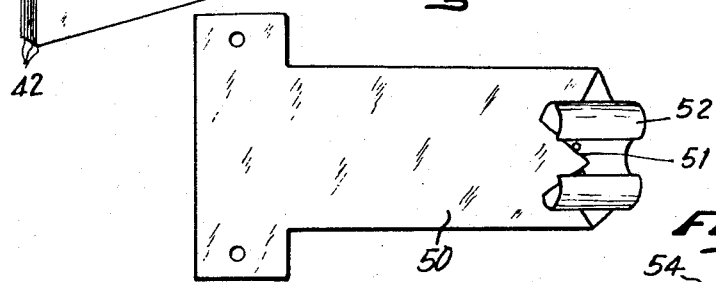
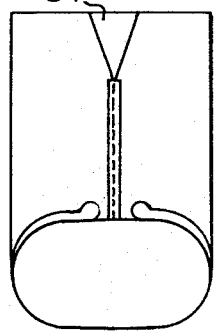
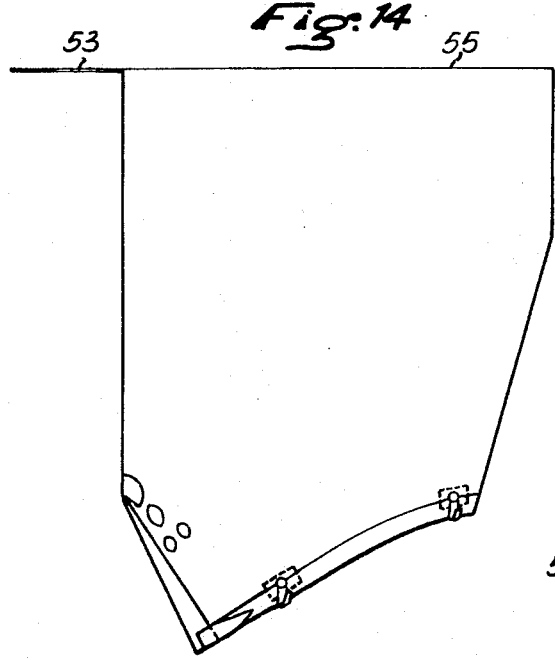
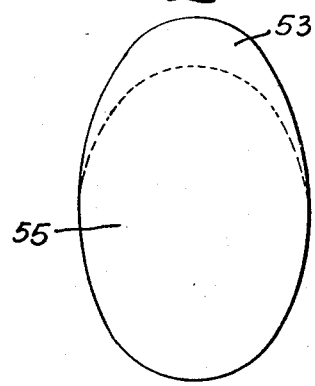
INVENTOR
JEAN-PHILIPPE CROUZET
By Irwin S. Thompson
ATTY.

United States Patent Office 3,295,511
Patented Jan. 3, 1967

3,295,511
HEADGEARS FOR PROTECTION AGAINST COLD AND UNCLEMENT WEATHER
Jean Philippe Crouzet, 128 Blvd. Malesherbes, Paris, France
Filed Feb. 10, 1965, Ser. No. 431,613
Claims priority, application France, Mar. 4, 1964, 966,084
6 Claims. (Cl. 126—208)

My invention has for its object improvements in the means for protecting the wearer's head against cold and unclement weather of the type including a shell or helmet of transparent material surrounding the head of the user and bearing through its lower section on his shoulders, on the upper end of his back and on his chest, while ports ensure the entrance of air as required for breathing in and for exhausting the expired air.

Such an arrangement is described in my French Patent 1,163,519 of December 18, 1956 and its first addition 52,506 dated November 22, 1957 and also in my French Patent 1,246,323 of October 8, 1959 and in the equivalent U.S. Patents 2,988,749, 2,989,049 and 3,075,200.

In last-mentioned patents, the arrangement is constituted by a sheet of a synthetic material, chiefly that sold under the registered trade name Rhodoid, and sheet of material being cut and shaped through bending and twisting and held in position after overlapping of the edges of the cuts by rivetting. In said last-mentioned patents the sheet of material is provided after cutting and before shaping with reinforcements of a similar material glued along the cut edges forming together reentering angles and also along the edge of the opening of the shell and round the ports provided for the rivets so as to reinforce the material which is considerably weakened and consequently very brittle at such points by reason of the inner strains produced by the deformation applied.

A further improvement forming the object of my invention consists in shaping the arrangement by assembling the edges of the cuts by means of adhesive strips holding said edges in abutting relationship.

Said arrangement cuts out the superposition of the edges and also the use of rivets, which use would lead to heavier systems. A varnish may then be extended over the adhesive strips so as to improve their impervious character and to prevent any risk of loosening under the action of rain.

According to a still further object of the invention, a reinforcement is glued along the two edges of the sheet of material closing the arrangement along its rear axis at the moment of its shaping.

According to a third improvement, when the arrangement is obtained, reinforcements for maintaining its shape are glued along the edge of the opening of the helmet, said reinforcements being cut in V-shape so as to ensure a rigid behavior of said opening and cutting out any risk of deformation or breaking. Said reinforcing shape-maintaining reinforcements appear as six strips, to wit a central substantially rectilinear reinforcement of a reduced length to the front, two small lateral reinforcements terminating with pointed tips, two lateral reinforcements of a more considerable length of a very elongated S-shape and lastly a central reinforcement of a very elongated oval shape.

According to a still further improvement according to my invention, a flap provided with slideways and with ports registering with those provided on the front lower surface of the helmet may be used so as to adjust the cross-sectional area of last-mentioned ports and consequently the admission of air inside the helmet.

In certain cases, the flap may be replaced by one or more deflecting members preventing any too intense input of air.

According to yet another improvement forming the object of my invention, when intended for use by motor cyclists, four ports only are required, said ports being distributed pairwise to each side of the lower front surface of the helmet. If the arrangement is to be worn by a pedestrian, or by any other person moving at a comparatively slow speed, there are provided two series of ports arranged in rows and including altogether about fifteen ports.

In the above-referred to French addition 72,506 to the French Patent 1,163,519, there is provided the incorporation with the protecting helmet of heating means. Such heating means are constituted by a channel through which air is fed under the control of a propeller driven by a small electric motor controlled by voltaic cells. Said channel provided for the input of air includes a metal section forming a heat exchanger between the air blown into the arrangement and a heat-generator constituted by an alcohol lamp. The voltaic cells and the alcohol lamp are enclosed inside a casing secured to the side of the arrangement and through which the air feeding channel extends.

My present invention has for its object improvements in the heating means referred to hereinabove and, according to said invention, the casing made of metal or molded plastic material and provided with an input door adapted to fluidtightly close, shows at its upper end an opening forming a chimney the cross-sectional area of which should be at least equal to 25 sq. cm. so as to prevent any extinction of the lamp flame. The metal part of the air input channel located inside the casing encloses an inner core formed by a system of thin metal foils arranged along a plurality of radial planes starting from the axis of a geometrical cylinder, said metal foils forming a radiator adapted to store the heat transmitted by the flame of the alcohol lamp and a heat exchanger transmitting the stored heat to the air passing between said foils.

According to a further feature of my invention, the metal section of the air input chanel is thermally insulated from the walls of the casing by extensions of said channel, of which extensions one forms a bent connection and the other a ring, said extensions being made of a heat-resisting glass or the like material and passing through the said walls of the casing to which they are fluidtightly secured.

According to two still further improvements according to my invention, the alcohol lamp is provided, underneath the nozzle holding the wick and which is welded so as to show no slot, with a collar-shaped plate acting as a deflector so as to prevent the vapors of evaporated alcohol from being inflamed and inflaming the alcohol which has evaporated and condenses in the upper part of the lamp. Such an alcohol lamp may include two nozzles and two wicks adapted to serve simultaneously and also a rectangular plate of which the size corresponds substantially to the size of the upper surface of its container so that the alcohol vapors cannot be inflamed or inflamed the alcohol condensed in the upper part of the lamp.

Figure 7:
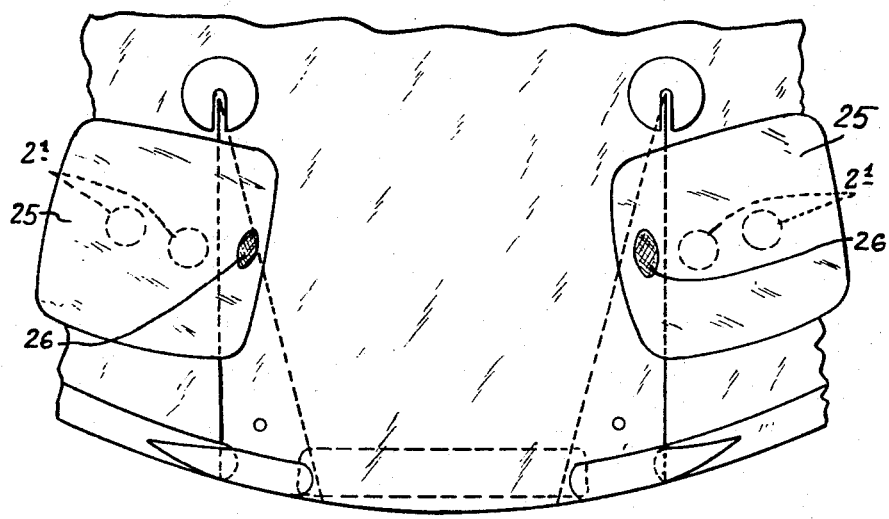
Figure 17:
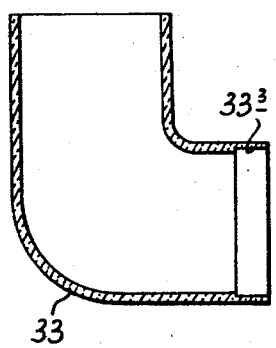
Figure 18:
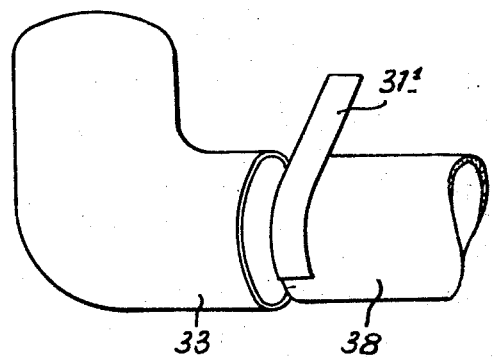
Figure 19:
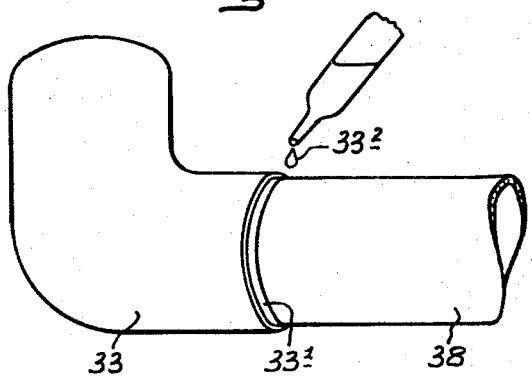
Figure 20:
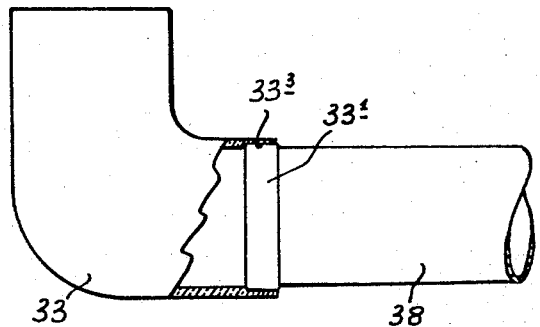

Further features and advantages of my invention will appear from the reading of the following description thereof, given by way of an exemplification and in a non-limiting sense, reference being made to the accompanying drawings wherein:

FIG. 1 is a view of the sheet of synthetic material in its flat condition, when cut and associated with reinforcements, FIG. 2 is a perspective view of the arrangement when shaped and provided with its reinforcements, FIG. 3 is a partial view of the front lower section of the helmet when finished, FIG. 4 is a partial view of the rear lower surface of said helmet when finished, FIG. 5 is partial view of a modified embodiment of the lower front surface of the helmet, FIG. 6 is a partial view of another embodiment of said lower front surface, FIG. 7 illustrates a modification of FIG. 3, FIG. 8 is a perspective view of the heating means, FIG. 9 is a detail view of said heating means, FIG. 10 is a perspective view of the heat-exchanging radiator, FIGS. 11 and 12 are views showing the execution of the heat exchanger according to FIG. 10, FIG. 13 is a detail view of the lug securing the motor, FIG. 14 is a side view of an embodiment of the helmet incorporating a peak, FIG. 15 is a rear view of the helmet according to FIG. 14, FIG. 16 is a view from above of the helmet illustrated in FIGS. 14 and 15, FIG. 17 is a cross-sectional view of the bend made of heat-resisting glass, which forms part of the heating means, FIG. 18 is a perspective view showing the assembly of said glass bend with the associated aluminium tube, as provided by means of a thin aluminium foil, FIG. 19 is a perspective view showing the application of a varnish on the bend so as to perfect its securing, FIG. 20 is a sectional view showing the end of the aluminium tube fitted inside the bend.

The helmet for protection against cold and inclement weather executed in accordance with my invention and illustrated in said drawings is obtained out of a sheet of a synthetic material such as that sold under the registered trade name Rhodoid, having a thickness of about six tenths of a mm., and cut so as to form after shaping the helmet illustrated in FIG. 2, which latter is provided in its section which is to cover the lower front part of the wearer's head with breathing ports 2. The waste obtained out of the cut sheet serves for executing the reinforcing parts, to wit: two circular parts 3 notched at 4 and adapted to be shaped and glued as shown in dotted lines at $3^1$ so as to reinforce the ends of the overlapping edges of the corresponding cuts 5 formed along parallel lines in the lower front surface of the arrangement as illustrated in FIGS. 3, 5 and 7, two rectangular reinforcing members 6 terminating with a pointed tip and adapted to be glued after the shaping of the helmet, so as to reinforce the outer ends of said overlapping edges of the cuts in the front surface of the helmet (FIGS. 2, 3, 5, 6 and 7), and a rectilinear strip 7 for reinforcing through gluing, after shaping of the helmet, the line joining the outer edges 8 and 9 of the sheet of material (FIG. 4) which edges are caused to abut against each other along the rear axial line of the helmet. The reinforcing members include also four reinforcing members 10 for reinforcing the securing points 11 for the helmet-fastening straps 12 (FIG. 12) which are to be fitted under the wearer's arms and lastly two rectangular reinforcing members 13 of which only one is illustrated in FIG. 1 and which are to form deflectors the use of which will be disclosed hereinafter.

From a sheet of material of a thickness of 8 to 9 tenths of a mm. are furthermore cut two strips 14 of a breadth of about 1 cm. in the shape of a very elongated S, said strips serving for the reinforcement of the lower edges of the helmet sides through gluing before the shaping, as shown at $14^1$ in FIG. 1. Further reinforcements 15 of a rectangular shape and 16 of an oval shape are cut in a thicker sheet of material of a thickness of 15 tenths of a mm. Said reinforcement 15 and 16 are glued respectively at $15^1$ and $16^1$ (FIG. 1) during the shaping of the helmet (FIGS. 3 and 4).

The shaping of the sheet of material 1 is executed as follows: the edges of the cuts 5 are caused to overlap so that the edges 17 belonging to the central section 18 of the sheet may extend over those belonging to the lateral sections 19, as illustrated in FIG. 3. The arrangement is then held fast in the position obtained by means of screws or bolts which are caused to pass through the ports 20 formed in the different sections and which register with each other for the overlapping position illustrated of the different sections of the sheet. Glue is laid between the two superposed surfaces of Rhodoid or the like material under each lower group of ports 20. This being done, the reinforcing member 7 is glued over the abutting edges 8 and 9 of the sections forming the rear of the helmet when closed as illustrated in FIG. 4, whereby the helmet assumes a generally cylindrical shape. By causing the edges of the different cuts formed in the upper part of the sheet of synthetic material to abut against one another and by holding them fast in such an abutting position by means of adhesive strips, such as 21 (FIG. 2), the upper section of the helmet is obtained in its final closed condition. It is then possible to set a layer of impervious varnish over the adhesive strips so as to ensure the airtightness of the helmet.

The whole helmet is then made rigid by shaping its front section by gluing the reinforcing members 6, as illustrated in FIG. 6, across the cuts 5. Glue is then laid round the screws passing through the ports 20 and when said glue is dry, the different screws are removed and the ports are closed by a further deposit of glue. The shaping of the helmet is brought to an end by gluing inside it securing members constituted by the transverse reinforcements, 15 for the front section and 16 for the rear section as illustrated in FIGS. 3 and 4. Without said two reinforcements 15 and 16, the helmet would be readily deformed and become speedily unfit for use.

When the helmet has thus been shaped, the small rectangular reinforcing members 10 (FIGS. 1 and 2) are threaded over male rivets which are inserted from the inside towards the outside of ports in the helmet, after which the securing means constituted by hooks 11 are fitted on the strap 12 and rivetted.

The helmet thus executed is chiefly intended for use by pedestrians who wish to be protected against cold and unclement weather. It may include in certain cases, a flap 22 sliding in two lateral slideways 23 as illustrated in FIG. 5. Said flap 22 is provided with ports 24 which may register to an adjustable extent with the breathing ports 2 in the helmet.

When operating said flap 22, the breathing ports 2 are closed to a variable extent, which allows adjusting the input of air into the helmet and avoiding any too energetic input. Of course, in order to obtain an efficient operation of the flap, the breathing ports arranged laterally with reference to the central ports illustrated in the other figures of the appended drawings are omitted in the case illustrated in FIG. 5.

If the helmet is intended to be worn by a user on a power-driven vehicle, the central breathing ports are omitted and only two ports $2^1$ are retained as shown on each side of the central section as in FIG. 6. It is possible when the motorist or motor-cyclist runs in areas where the atmospheric temperature is under freezing point to provide in front of said ports $2^1$, deflectors 25 which prevent a too energetic input of air, as illustrated in FIG. 7. Said deflectors 25 are constituted by rectangular plates and are glued at 26 as illustrated in FIG. 7.

The helmet may also be executed, as illustrated in FIGS. 14, 15 and 16 with a peak or eye-shade 53 which protects the wearer against rain and snow. In said embodiment, the lateral surfaces of the helmet are vertical and are raised up to the same level as the center of its upper section. The apex of its rear section is slightly bent at 54 as shown in FIG. 15, through an overlapping of its two slides. The upper section 55 of the helmet is obtained by gluing an oval sheet made of a synthetic material such as that sold under the registered trade name Rhodoid referred to hereinabove. Said oval sheet projects forwardly of the helmet so as to form the eye-shade 53. Such a helmet is slightly heavier than that described hereinabove, but it is more easily and speedily executed. Furthermore, it does not hinder the movements of the head of the wearer who wears at the same time a motor-cyclist's helmet.

According to my invention, the arrangement may incorporate a heating system 27 as illustrated in FIGS. 8 and 9, said system including a casing 27 made of metal or molded plastic material provided with a fluidtight input door which is not illustrated. Said casing is laterally secured to the helmet by means of screws or bolts which are not illustrated. Its measurements may be 18 x 12 x 7 cm. or thereabouts and it includes in its upper section a gate 29 protected by a stationary open flap 30 measuring about 7 x 3.5 cm. Said gate is essential so as to produce a draught and thereby an input of air towards the alcohol lamp 31. An air input channel designated as a whole by the reference 32 in FIG. 8 extends through the upper section of the casing 28 into the helmet through a bend shown at 33. At the end opposed to the bend 33, the channel 32 carries a funnel 34 adapted to collect the air conveyed through a propeller 35 driven by an electric motor 36 of which the data will be disclosed hereinafter.

Said electric motor 36 is fed by a voltaic cell 37 lying underneath the alcohol lamp 31. A shield which is not illustrated may be secured to the casing, so as to protect the motor against snow and rain.

I will now describe with further detail the different parts referred to hereinabove. The channel 32 and its auxiliaries may be arranged as illustrated in FIG. 8, that is with the propeller blowing from the rear to the front in the case of the heating system being provided for a pedestrian's helmet or reversely it may be inserted in the opposite direction, that is with the propeller blowing from the front towards the rear in the case of a heating system adapted to equip a helmet for motor-cyclists and motorists. Said channel is constituted by a central portion 38 (FIG. 4) located inside the casing and constituted by an aluminium tube of a thickness of 3 tenths of a mm., of a length of 10.5 cm. and of an outer diameter of 4 cm. Its two ends are locked by screwing, wedging (FIG. 18) or otherwise, one end being fitted in the inwardly bevelled end 33[3] (FIGS. 3, 17) of the bend 33 which is made of a heat-resisting glass of the type sold in trade under the registered trade name Pyrex and having a thickness of 1 mm., said bend end entering the casing through one of its side walls, while the other end of the channel enters a ring 39, also of a heat-resisting glass having a thickness of 2 mm., which ring extends through the corresponding wall of the casing. Said arrangement of glass parts serves for the heat insulation of the aluminium tube 38 with reference to the walls of the casing. The gas-tightness of the annular interval between the casing and the glass sections is obtained by elements of an adhesive fabric 40 fitted inside the casing, partly on the latter and partly on the glass sections. The locking of the aluminium tube 38 with reference to the bend 33 and to the ring 39 is obtained in a highly resistant and gastight manner through the application of some pieces of thin aluminium ribbon and of a few drops of a colorless and odorless varnish 33[2] which is resistant to heat when dry (FIG. 19) such as that sold under the registered trade name Jacquet UP 50. Inside the tube 38 is fitted a heat exchanger 41 constituted by a cylindrical structure made of annealed aluminium sheet foils 42, of a thickness of 25 thousandths of a mm. and the breadth of which matches the outer diameter of the tube 38, said foils being distributed along radial planes in said cylinder. Said aluminium foils in intimate contacting relationship through their outer edges with the inner wall of the tube 38 are subjected to the heat transmitted to the tube 38 by the flame of the alcohol lamp 31 and store said heat. The air blown in by the propeller 34 as it passes between the aluminium foils 42 is speedily heated and enters inside the helmet. The number of aluminium foils 42 may range between 35 and 51. In the absence of such aluminium foils, that is of the heat exchanger 41, the radiator associated with the motor described hereinafter would lead to a heating by only 12° C. But if the 51 foil arrangement weighing only 14 gr. is fitted inside the cylinder, the radiator will produce a heating of the air by more than 67° C. above ambient temperature. In order to obtain a cylindrical shape for the foil system 42, it is sufficient to interconnect the foils arranged packwise along a medial line, as illustrated in FIG. 11 and then to urge the outer longitudinal edges of the folios apart, along both sides of the pack, as illustrated in FIG. 12.

The alcohol lamp 31 includes a container 43 of a rectangular shape, the size being for instance 5.7 x 11.9 x 2.9 cm. so as to match the size of the horizontal cross-section of the casing, assuming the latter measures 18 x 12 x 7 cm. The spacing between the apex of the nozzle and the level of the alcohol should never be larger than 57 mm., since otherwise the wick would char and the flame would be extinguished. The lamp includes a nozzle 44 welded so as not to show any slot and enclosing a wick 45 associated with a knob 46 for adjusting the height of the wick.

The spacing between the upper end of the nozzle 44 and the radiator tube 38 should be equal to 13 mm. A plate 47 of a circular or rectangular shape surrounds the nozzle 44 so as to form a deflector preventing the vapors of alcohol from being inflamed and from inflaming the alcohol which has been evaporated and has condensed in the upper part of the lamp. According to a modification which is not illustrated, the alcohol lamp 31 may be provided with two nozzles 44 and correspondingly with two wicks 45. In such a case, the plate 47 is replaced by a rectangular plate forming a deflector for both nozzles. Such a plate extends almost over the entire cross-sectional area of the lamp container. With such a lamp, it is possible to increase the heating when the heating system is provided for use in a very cold or polar country. In fact, it is possible with such an arrangement to obtain a rise in temperature by 120° C. without this leading to any damage to the heating system.

The air collecting means formed by the funnel 34 are constituted by a copper foil of a thickness of 5 hundredths of a mm.; it is secured round the ring 39 and welded through the small lugs 34[1] extending inside the casing.

The electric motor 35 is a small motor of an industrial type of a very small bulk. Its securing is ensured by a lug 50 constituted by a metal strip 3.4 cm. broad, 14.5 cm. long and 3 tenths of a mm. thick. It includes a T-shaped section with two openings through which it is secured to the casing and a section 51 clamped in V-shape and terminating with two cooperating half-ring sections 52 inside which the actual motor is held. Said motor revolves at 6.750 r.p.m. It has a power of 1 watt and develops a torque of 20 cmg. and it requires a feeding current of 340 milliamperes. The voltaic cell feeding the motor is a cell of 4.5 volts. Two electric wires 48, of which one is provided with a switch 49 connect the motor 35 with the cell 37 and pass through openings provided for this purpose in the casing.

The above-disclosed embodiments are given out by mere way of exemplification and many modifications may be brought thereto within the scope of the accompanying claims.

What I claim is:
1. A helmet adapted to protect the wearer's head against cold and unclement weather constituted by a bent sheet of plastic material, the lateral edges of which face each other to close the rear of the helmet, said sheet being provided with ports in its section which forms the lower front part of the helmet and with a number of cuts along the upper and lower peripheries of the helmet formed by it, adhesive strips fitted across the edges of the cuts of the bent sheet to hold said edges in abutting relationship, and a flap slidingly carried by the front of the helmet-forming sheet and provided with ports adapted to register to an adjustable extent with the ports in the helmet-forming sheet upon shifting of the flap.

2. A helmet adapted to protect the wearer's head against cold and unclement weather constituted by a bent sheet of plastic material, the lateral edges of which face each other to close the rear of the helmet, said sheet being provided with ports in its section which forms the lower front part of the helmet and with a number of cuts along the upper and lower peripheries of the helmet formed by it, adhesive strips fitted across the edges of the cuts of the bent sheet to hold said edges in abutting relationship, and at least one deflector cooperating with the ports in the helmet forming sheet.

3. A helmet adapted to protect the wearer's head against cold and unclement weather constituted by a bent sheet of plastic material, the lateral edges of which face each other to close the rear of the helmet, said sheet being provided with a number of cuts along the upper and lower peripheries of the helmet formed by it, adhesive strips fitted across the edges of the cuts of the bent sheet to hold said edges in abutting relationship, means for heating the air entering the helmet, said means including a casing secured to the outside of the sheet, a tubular metal section carried inside the casing and through which the atmospheric air enters the helmet, an inner cylindrical core fitted inside the said tubular section and constituted by radially distributed interconnected metal foils forming a heat storing and distributing system, and means for heating said metal section and core.

4. A helmet adapted to protect the wearer's head against cold and unclement weather constituted by a bent sheet of plastic material, the lateral edges of which face each other to close the rear of the helmet, said sheet being provided with a number of cuts along the upper and lower peripheries of the helmet formed by it, adhesive strips fitted across the edges of the cuts of the bent sheet to hold said edges in abutting relationship, means for heating the air entering the helmet, said means including a casing secured to the outside of the sheet, a tubular metal section carried inside the casing, an inner cylindrical core fitted inside the said tubular section and constituted by radially distributed interconnected metal foils forming a heat storing and distributing system, means for heating said metal section and core, a funnel of heat-insulating material fitted in one casing wall and opening into one end of the tubular section to feed atmospheric air into it, a ring of heat-insulating material fitted in the opposite casing wall in registry with the other end of the tubular section and through which the air flowing through the funnel and over the core enters the helmet, aluminum strips and heat-resisting varnish fitted air-tightly between the metal section and the cooperating funnel, and ring and adhesive strips fitted air-tightly between the casing and said funnel and ring.

5. A helmet adapted to protect the wearer's head against cold and unclement weather constituted by a bent sheet of plastic material, the lateral edges of which face each other to close the rear of the helmet, said sheet being provided with a number of cuts along the upper and lower peripheries of the helmet formed by it, adhesive strips fitted across the edges of the cuts of the bent sheet to hold said edges in abutting relationship, means for heating the air entering the helmet, said means including a casing secured to the outside of the sheet, a tubular metal section carried inside the casing, an inner cylindrical core fitted inside the said tubular section and constituted by radially distributed interconnected metal foils forming a heat storing and distributing system, an alcohol lamp for heating said metal section and core said alcohol lamp being provided, underneath the nozzle holding the wick and which is welded so as to show no slot, with a plate in the shape of a collar acting as a deflector which prevents the vapors of evaporated alcohol from being inflamed and inflaming the evaporated alcohol which may condense in the upper part of the lamp, a funnel of heat-insulating material fitted in one casing wall and opening into one end of the tubular section to feed atmospheric air into it, a ring of heat-insulating material fitted in the opposite casing wall in registry with the other end of the tubular section and through which the air flowing through the funnel and over the core enters the helmet, aluminum strips and heat-resisting varnish fitted air-tightly between the metal section and the cooperating funnel, and ring and adhesive strips fitted air-tightly between the casing and said funnel and ring.

6. A helmet adapted to protect the wearer's head against cold and unclement weather constituted by a bent sheet of plastic material, the lateral edges of which face each other to close the rear of the helmet, said sheet being provided with a number of cuts along the upper and lower peripheries of the helmet formed by it, and adhesive strips fitted across the edges of the cuts of the bent sheet to hold said edges in abutting relationship, means for heating the air entering the helmet, said means including a casing secured to the outside of the sheet, a tubular metal section carried inside the casing and through which the atmospheric air enters the helmet, an inner cylindrical core fitted inside the said tubular section and constituted by radially distributed interconnected metal foils forming a heat storing and distributing system, and an alcohol lamp with two nozzles and two wicks carried in the casing and adapted to heat the said metal section and core.

References Cited by the Examiner
UNITED STATES PATENTS

| | | | |
|---|---|---|---|
| 1,482,270 | 1/1924 | Shuster | 2—205 |
| 2,445,487 | 7/1948 | Lester et al. | 2—174 |
| 3,075,200 | 1/1963 | Crouzet | 2—3 |

FREDERICK L. MATTESON, JR., *Primary Examiner.*

E. G. FAVORS, *Assistant Examiner.*